United States Patent
Sarkisian et al.

(10) Patent No.: US 9,708,495 B2
(45) Date of Patent: Jul. 18, 2017

(54) INK SETS FOR INK-JET PRINTING

(75) Inventors: George Sarkisian, San Diego, CA (US); Keshava A. Prasad, San Diego, CA (US); John Morrow Gardner, San Diego, CA (US); Tayo Olu Yolemi, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 191 days.

(21) Appl. No.: 14/350,779

(22) PCT Filed: Oct. 28, 2011

(86) PCT No.: PCT/US2011/058268
§ 371 (c)(1),
(2), (4) Date: Apr. 9, 2014

(87) PCT Pub. No.: WO2013/062573
PCT Pub. Date: May 2, 2013

(65) Prior Publication Data
US 2014/0253650 A1 Sep. 11, 2014

(51) Int. Cl.
*C09D 11/322* (2014.01)
*C09D 11/38* (2014.01)
*C09D 11/40* (2014.01)

(52) U.S. Cl.
CPC ............ *C09D 11/322* (2013.01); *C09D 11/38* (2013.01); *C09D 11/40* (2013.01)

(58) Field of Classification Search
CPC ........ C09D 11/322; C09D 11/38; C09D 11/40
See application file for complete search history.

(56) References Cited

U.S. PATENT DOCUMENTS

| | | | |
|---|---|---|---|
| 5,169,437 A * | 12/1992 | You | C09D 11/30 106/31.58 |
| 5,886,065 A | 3/1999 | Tsang et al. | |
| 5,891,232 A | 4/1999 | Moffatt et al. | |
| 5,891,934 A | 4/1999 | Moffatt et al. | |
| 6,114,411 A * | 9/2000 | Nakamura | C09D 11/322 523/161 |
| 7,479,178 B2 | 1/2009 | Dodge et al. | |
| 7,479,180 B2 | 1/2009 | Vasudevan | |
| 7,537,650 B2 | 5/2009 | Szajewski et al. | |
| 8,044,115 B2 | 10/2011 | Brust et al. | |
| 2003/0019395 A1 | 1/2003 | Ma et al. | |
| 2005/0014864 A1 | 1/2005 | Akers, Jr. et al. | |
| 2005/0225615 A1 * | 10/2005 | Sader | C09D 11/54 347/95 |
| 2007/0225400 A1 | 9/2007 | Schmid et al. | |
| 2009/0169762 A1 | 7/2009 | Szajewski et al. | |
| 2009/0288579 A1 | 11/2009 | Ham et al. | |
| 2010/0055322 A1 | 3/2010 | Brust et al. | |
| 2010/0165020 A1 * | 7/2010 | Tojo | B41J 2/14233 347/9 |

FOREIGN PATENT DOCUMENTS

| | | | |
|---|---|---|---|
| EP | 1174475 | * | 1/2002 |
| EP | 1808225 | | 7/2007 |
| WO | 2009134247 | | 11/2009 |
| WO | WO 2011/014196 | * | 2/2011 |
| WO | 2011078842 | | 6/2011 |

OTHER PUBLICATIONS

English abstract of EP 1174475, De Rossi, Feb. 2002.*
Extended European Search Report dated Aug. 4, 2015 for PCT/US2011058268, Applicant Hewlett-Packard Development Company, L.P.

* cited by examiner

*Primary Examiner* — Patrick Niland
(74) *Attorney, Agent, or Firm* — Thorpe, North & Western L.L.P.

(57) ABSTRACT

The present disclosure is drawn to ink-jet ink sets, as well as related systems and methods. In one example, an ink set for ink-jet printing can comprise a cyan ink-jet ink including from about 2 wt % to about 5 wt % of a cyan pigment admixed in a first ink vehicle; a magenta ink-jet ink including a magenta colorant comprising from about 2 wt % to about 5 wt % of a magenta pigment and about 0.1 wt % to about 1 wt % of a slightly soluble magenta dye admixed in a second ink vehicle; and a yellow ink-jet ink including from about 2 wt % to about 5 wt % of a yellow pigment admixed in a third ink vehicle.

15 Claims, No Drawings

INK SETS FOR INK-JET PRINTING

BACKGROUND

There are several reasons that ink-jet printing has become a popular way of recording images on various media surfaces, particularly paper. Some of these reasons include low printer noise, capability of high-speed recording, and multi-color recording. Additionally, these advantages can be obtained at a relatively low price to consumers. However, though there has been great improvement in ink-jet printing, accompanying this improvement is increased demand by consumers in this area as a result of higher speeds, higher resolution, full color image formation, increased stability, etc. As new ink-jet inks are developed, there have been several traditional characteristics considered when evaluating the ink in conjunction with a printing surface or substrate. Such characteristics include edge acuity and optical density of the image on the surface, dry time of the ink on the substrate, adhesion to the substrate, lack of deviation in ink droplet placement, presence of all dots, resistance of the ink after drying to water and other solvents, long term storage stability, and long term reliability without corrosion or nozzle clogging. Though the above list of characteristics provides a worthy goal to achieve, there are difficulties associated with satisfying all of the above characteristics. Often, the inclusion of an ink component meant to satisfy one of the above characteristics can prevent another characteristic from being met. Thus, most commercial inks for use in ink-jet printers represent a compromise in an attempt to achieve at least an adequate response in meeting all of the above listed requirements.

Accordingly, investigations continue into developing ink formulations that have improved properties and that do not improve one property at the significant expense of the others.

DETAILED DESCRIPTION

Before the present disclosure is set forth, it is to be understood that this disclosure is not limited to the particular process steps and materials disclosed herein because such process steps and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is noted that, as used in this specification and the appended claims, the singular forms "a," "an," and "the" include plural referents unless the context clearly dictates otherwise.

As used herein, "liquid vehicle" or "ink vehicle" refers to the liquid fluid in which colorant is placed to form an ink. Ink vehicles are well known in the art, and a wide variety of ink vehicles may be used with the systems and methods of the present disclosure. Such ink vehicles may include a mixture of a variety of different agents, including, surfactants, solvents, co-solvents, anti-kogation agents, buffers, biocides, sequestering agents, viscosity modifiers, surface-active agents, water, etc. Though not part of the liquid vehicle per se, in addition to the colorants, the liquid vehicle can carry solid additives such as polymers, latexes, UV curable materials, plasticizers, salts, etc. Additionally, the term "aqueous liquid vehicle" or "aqueous vehicle" refers to a liquid vehicle including water as a solvent. In one aspect, water can comprise a majority of the liquid vehicle.

The term "solvent system" includes the solvents or co-solvents present in a liquid vehicle, but excludes water.

The term "surfactant system" includes any and all surfactants present in a liquid vehicle.

As used herein, "colorant" can include dyes and/or pigments.

As used herein, "dye" refers to compounds or molecules that impart color to an ink vehicle. As such, dye includes molecules and compounds that absorb electromagnetic radiation or certain wavelengths thereof. For example, dyes include those that fluoresce and those that absorb certain wavelengths of visible light.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe not only pigment colorants, but other pigments such as organometallics, ferrites, ceramics, etc. In one specific aspect, however, the pigment is a pigment colorant.

As used herein, "polymer-dispersed," when referring to a pigment, refers to a polymer that is absorbed or other wise associated with the pigment such that the pigment remains dispersed in a liquid vehicle, but where the polymer is not covalently bonded to the pigment.

"Polymer-attached," when referring to a pigment, refers to embodiments where a polymer is covalently attached (rather than absorbed or adsorbed on a pigment surface) to the surface of a pigment.

As used herein, the term "curling" or "curl" refers to any distortion of a sheet of paper or other ink-jet recording medium due to ink-jet printing on at least one side of the paper or medium.

As used herein, "curl performance" of an ink refers to performance of print media when printing on one entire side thereof. As a standard, such performance can be determined generally using plain paper (available from Domtar) at 100% coverage and measuring the amount of curl after 72 hours. In one example, "acceptable curl performance" can be defined as having a curl of less than 20 mm when measured from each corner of the sheet and averaged over at least 5 sheets. In another example, "exceptional curl performance" can be defined as having a curl of less than 10 mm.

As used herein, "waterfastness" refers to the ability of an ink-jet ink to remain adhered to a paper or recording medium as printed when exposed to water or aqueous solvent.

As used herein, "waterfastness performance" can be measured as individually printing the an ink-jet ink at 100% coverage on a paper, allowing the image to dry, tilting the image to a 45° angle, dropping 0.1 ml of water on the image, allowing the image to dry for 24 hours, and measuring the optical density (OD) of a non-printed portion directly below the printed portion. In one example, "acceptable waterfastness performance" can be defined as the non-printed portion measuring less than 50 mOD units. In another example, "exceptional waterfastness performance" can be defined as the non-printed portion measuring less than 25 mOD units.

As used herein, "decap" refers to the process of jetting a normal ink drop from pen nozzle by breaking the "plug" or "cap" of solidified ink. The plug or cap is currently understood to be generated by the evaporation of ink vehicle.

As used herein, "decap performance" refers to the number of electric pulses fired before a normal ink drop is once again jetted out of an orifice after the nozzle has been rested for a certain amount of time, forming a plug. In one example, an "acceptable decap performance" can be defined as an inkjet pen nozzle firing an ink drop within 4 electric firing pulses after the nozzle is rested for 3 seconds. In another example, an "exceptional decap performance" can be defined as an inkjet pen nozzle firing an ink drop within 1 electric firing pulses after the nozzle is rested for 3 seconds.

With respect to determining decap performance, a "normal" ink drop refers to ink fired from an inkjet pen without misdirection.

As used herein, "slightly soluble," when referring to a dye, refers to the dye being soluble of less than 5 wt % in water.

As used herein, "soluble," when referring to a dye, refers to the dye being soluble of more than 5 wt % in water.

As used herein, "ink-jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 wt % to about 5 wt %" should be interpreted to include not only the explicitly recited values of about 1 wt % to about 5 wt %, but also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting only one numerical value. Furthermore, such an interpretation should apply regardless of the breadth of the range or the characteristics being described.

With this in mind, the present disclosure is drawn to the area of ink-jet printing. More specifically, the present disclosure provides ink sets for ink-jet printing having acceptable or even exceptional waterfastness, paper curl, and/or decap when using certain pigments with specific ink vehicles.

In one example, an ink set for ink-jet printing can comprise a cyan ink-jet ink including from about 2 wt % to about 5 wt % of a cyan pigment admixed in a first ink vehicle, a magenta ink-jet ink including a magenta colorant comprising from about 2 wt % to about 5 wt % of a magenta pigment and about 0.1 wt % to about 1 wt % of a slightly soluble magenta dye admixed in a second ink vehicle; and a yellow ink-jet ink including from about 2 wt % to about 5 wt % of a yellow pigment admixed in a third ink vehicle. Generally, the first, second, and third ink vehicle can individually comprise about 1 wt % to about 30% of a solvent system including a glycol, a first cyclic amine, and a second cyclic amine; and about 0.1 wt % to about 3 wt % of a surfactant system. In one specific example, the solvent system can further comprise a second glycol. In another example, the solvent system can further comprise a diol. In yet another aspect, the diol can be 1,6-hexanediol. The ink vehicle can be an aqueous ink vehicle, and in such cases, the water is not considered to be part of the "solvent system."

The pigments used herein can be polymer-dispersed pigments or polymer-attached pigments. In one example, the pigment is a polymer-dispersed pigment, such as a styrene-acrylic resin. In another aspect, the styrene-acrylic resin can have an acid number between 40 and 150 and/or a weight average molecular weight ($M_w$) between 4,000 and 20,000 (e.g. Joncryl® 683 from BASF). Additional resins may also be used in conjunction with the pigment, dye, and/or ink vehicles, as discussed herein.

The present ink vehicles generally also include a surfactant system. In one example, the surfactant system can comprise at least two surfactants. In another aspect, the surfactant system includes a fluorosurfactant (e.g. Zonyl® FSO from by DuPont) and an acetylene oxide surfactant (e.g. Surfynol® SE-F from Air Products). Other surfactants may also be used as described herein.

Various colorants can be used in the inks described herein. Thus, the ink set can include a cyan ink, a magenta ink, and a yellow ink. Regarding the cyan ink, the cyan pigment can be a copper phthalocyanine-based pigment including derivatives of C.I. Pigment Blue 15:3 (e.g. Cyan Pigment such as DIC-C026 from DIC, E114645 from Dupont, RXD Cyan from Fujifilm Imaging Colorants (FFIC)). With the magenta ink, the magenta colorant can include a magenta pigment and a slightly soluble magenta dye. In one aspect, the magenta pigment can be a quinacridone-based pigment including derivatives of C.I. Pigment Red 282 (e.g. Magenta Pigment DIC-045 or DIC-034 from DIC, E714645 from Dupont, or Magenta from FFIC). In another aspect, the slightly soluble magenta dye can be Pro-Jet™ Fast 2 Magenta Dye from FFIC. Regarding the yellow ink, the yellow pigment can be a butanamide-based pigment including derivatives of C.I. Pigment Yellow 74 (e.g. Yellow Pigment DIC HPC-5002 from DIC or Yellow Pigment 251 from FFIC).

The colorants, including pigments and/or dyes, described herein can be used in the conjunction with certain ink vehicles to provide improved performance. For example, in one example, the ink vehicle can include an anti-kogation agent. In such embodiments, the magenta colorant and an anti-kogation agent can be present in the magenta ink-jet ink in a weight ratio of from 4:1 to 7:1. In another example, the cyan pigment and an anti-kogation agent can be present in the cyan ink-jet ink in a weight ratio of from 2:1 to 3:1. In still another example, the yellow pigment and an anti-kogation agent can be present in the yellow ink-jet ink in a weight ratio of from 3:1 to 4:1.

The ink sets for printing ink-jet images disclosed herein can be used with commercially available ink-jet printers, such as those available from the Hewlett-Packard Company. These ink sets can produce true colors on a variety of recording media, including uncoated media, clay coated media, inorganic porous media, and gelatin-coated media, often with acceptable lightfastness and gamut.

Additionally, a method of manufacturing an ink set having a cyan ink-jet ink, a magenta ink-jet ink, and a yellow ink-jet ink can comprise admixing a first ink vehicle with a cyan pigment to form the cyan ink-jet ink. The cyan pigment can be present in the cyan ink-jet ink in an amount of from about 2 wt % to about 5 wt %. An additional step includes admixing a second ink vehicle with a magenta colorant comprising a magenta pigment and a slightly soluble magenta dye to form the magenta ink-jet ink, the magenta pigment being present in the magenta ink-jet ink in an amount of from about 2 wt % to about 5 wt % and the slightly soluble magenta dye present in the magenta ink-jet ink in an amount of from about 0.1 wt % to about 1 wt %. An additional step includes admixing a third ink vehicle with a yellow pigment to form the yellow ink-jet ink, the yellow pigment being present in the yellow ink-jet ink in an amount of from about 2 wt % to about 5 wt %. As discussed above, the first, second, and third ink vehicle individually can comprise about 1 wt % to about 30% of a solvent system including a glycol, a first cyclic amine, and a second cyclic amine; and about 0.1 wt % to about 3 wt % of a surfactant system.

Further, a system for printing an ink-set can comprise an ink set, as disclosed herein, and an ink-jet printer having the cyan ink-jet ink, the magenta ink-jet ink, and the yellow ink-jet ink loaded therein.

General ink vehicle formulations can include one or more solvent or co-solvents, and one or more non-ionic, cationic, and/or anionic surfactant. The balance of the formulation can be purified water, or other vehicle components known in the art such as biocides, anti-kogation agents, viscosity modifiers, materials for pH adjustment, sequestering agents, preservatives, and the like.

Classes of solvents or co-solvents that can be used in addition to those described above can include aliphatic alcohols, aromatic alcohols, diols, glycol ethers, polyglycol ethers, caprolactams, formamides, acetamides, and long chain alcohols. Examples of such compounds include primary aliphatic alcohols, secondary aliphatic alcohols, 1,2-alcohols, 1,3-alcohols, 1,5-alcohols, 1-6-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

One or more of many other surfactants can also be used, in addition to those described as part of the surfactant system, as are known by those skilled in the art of ink formulations. Such surfactants include alkyl polyethylene oxides, alkyl phenyl polyethylene oxides, polyethylene oxide block copolymers, acetylenic polyethylene oxides, polyethylene oxide(di)esters, polyethylene oxide amines, protonated polyethylene oxide amines, protonated polyethylene oxide amides, dimethicone copolyols, substituted amine oxides, and the like.

Consistent with the formulation of this disclosure, various other additives may be employed to optimize the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, Nuosept (Nudex, Inc.), Ucarcide (Union carbide Corp.), Vancide (R.T. Vanderbilt Co.), Proxel (ICI America), and combinations thereof. Sequestering agents such as EDTA (ethylene diamine tetra acetic acid) may be included to eliminate the deleterious effects of heavy metal impurities, and buffer solutions may be used to control the pH of the ink. Viscosity modifiers and buffers may also be present, as well as other additives known to those skilled in the art to modify properties of the ink as desired.

EXAMPLES

The following examples illustrate the examples of the disclosure that are presently best known. However, it is to be understood that the following are only exemplary or illustrative of the application of the principles of the present disclosure. Numerous modifications and alternative compositions, methods, and systems may be devised by those skilled in the art without departing from the spirit and scope of the present disclosure. The appended claims are intended to cover such modifications and arrangements.

Example 1—Ink-Jet Ink Vehicles

Seven ink-jet ink vehicles were formulated as provided below in Tables 1a-1f as outlined below.

TABLE 1a

Ink Vehicle 1

| Component | Amount |
| --- | --- |
| Zonyl FSO by DuPont | 0.10 wt % |
| Surfynol SE-F by Air Products | 0.80 wt % |
| 2-hydroxyethyl-2-pyrrolidone | 8.0 wt % |
| 2-pyrrolidone | 7.0 wt % |
| 1,6-hexanediol | 3.0 wt % |
| tetraethylene glycol | 3.0 wt % |
| LEG-1 (liponic ethoxylated glycol) by Lipo ® Technologies | 1.0 wt % |
| Crodafos ™ by Croda Inc. | 0.8 wt % |
| Water | Balance |

TABLE 1b

Ink Vehicle 2

| Component | Amount |
| --- | --- |
| Zonyl FSO by DuPont | 0.10 wt % |
| Surfynol SE-F by Air Products | 0.80 wt % |
| 2-hydroxyethyl-2-pyrrolidone | 8.0 wt % |
| 2-pyrrolidone | 7.0 wt % |
| 1,6-hexanediol | 3.0 wt % |
| tetraethylene glycol | 3.0 wt % |
| LEG-1 (liponic ethoxylated glycol) by Lipo ® Technologies | 2.0 wt % |
| Crodafos ™ by Croda Inc. | 1.0 wt % |
| Water | Balance |

TABLE 1c

Ink Vehicle 3

| Component | Amount |
| --- | --- |
| Zonyl FSO by DuPont | 0.10 wt % |
| Surfynol SE-F by Air Products | 0.60 wt % |
| 2-hydroxyethyl-2-pyrrolidone | 8.0 wt % |
| 2-pyrrolidone | 7.0 wt % |

TABLE 1c-continued

Ink Vehicle 3

| Component | Amount |
| --- | --- |
| 1,6-hexanediol | 3.0 wt % |
| tetraethylene glycol | 3.0 wt % |
| LEG-1 (liponic ethoxylated glycol) by Lipo ® Technologies | 2.0 wt % |
| Crodafos ™ by Croda Inc. | 1.0 wt % |
| Water | Balance |

TABLE 1d

Ink Vehicle 4

| Component | Amount |
| --- | --- |
| Zonyl FSO by DuPont | 0.10 wt % |
| Surfynol SE-F by Air Products | 0.75 wt % |
| 2-hydroxyethyl-2-pyrrolidone | 6.0 wt % |
| 2-pyrrolidone | 5.0 wt % |
| 1,6-hexanediol | 6.0 wt % |
| tetraethylene glycol | 6.0 wt % |
| LEG-1 (liponic ethoxylated glycol) by Lipo ® Technologies | 2.0 wt % |
| Crodafos ™ by Croda Inc. | 1.0 wt % |
| Water | Balance |

TABLE 1e

Ink Vehicle 5

| Component | Amount |
| --- | --- |
| Zonyl FSO by DuPont | 0.10 wt % |
| Surfynol SE-F by Air Products | 0.75 wt % |
| 2-hydroxyethyl-2-pyrrolidone | 9.0 wt % |
| 2-pyrrolidone | 5.0 wt % |
| 1,6-hexanediol | 9.0 wt % |
| tetraethylene glycol | 0 wt % |
| LEG-1 (liponic ethoxylated glycol) by Lipo ® Technologies | 2.0 wt % |
| Crodafos ™ by Croda Inc. | 1.0 wt % |
| Water | Balance |

TABLE 1f

Ink Vehicle 6

| Component | Amount |
| --- | --- |
| Zonyl FSO by DuPont | 0.10 wt % |
| Surfynol SE-F by Air Products | 0.80 wt % |
| 2-hydroxyethyl-2-pyrrolidone | 6.0 wt % |
| 2-pyrrolidone | 5.0 wt % |
| 1,6-hexanediol | 6.0 wt % |
| tetraethylene glycol | 6.0 wt % |
| LEG-1 (liponic ethoxylated glycol) by Lipo ® Technologies | 2.0 wt % |
| Crodafos ™ by Croda Inc. | 1.0 wt % |
| Water | Balance |

TABLE 1g

Ink Vehicle 7

| Component | Amount |
| --- | --- |
| Zonyl FSO by DuPont | 0.10 wt % |
| Surfynol SE-F by Air Products | 0.60 wt % |
| 2-hydroxyethyl-2-pyrrolidone | 9.0 wt % |
| 2-pyrrolidone | 5.0 wt % |
| 1,6-hexanediol | 9.0 wt % |
| tetraethylene glycol | 0 wt % |
| LEG-1 (liponic ethoxylated glycol) by Lipo ® Technologies | 2.0 wt % |
| Crodafos ™ by Croda Inc. | 1.0 wt % |
| Water | Balance |

Example 2—Ink-Jet Inks Having Dispersed Pigments

Three cyan ink-jet inks (C1, C2, C3) were prepared using the ink vehicles provided in Table 1b, 1d, and 1e from Example 1, respectively with cyan pigments from Cabot as outlined in Table 2. Five magenta ink-jet inks (M1, M2, M3, M4, and M5) were prepared using the ink vehicles provided in Table 1a, 1d, 1e, 1f, and 1g from Example 1, respectively with magenta pigments from Cabot and a magenta dye from FFIC as outlined in Table 2. Three yellow ink-jet inks (Y1, Y2, and Y3) were prepared using the ink vehicles provided in Table 1c, 1d, and 1e from Example 1, respectively with yellow pigments from Cabot as outlined in Table 2. The ink-jet inks prepared are shown in Table 2 below:

TABLE 2

Pigment/Dye Concentrations for Each Ink-Jet Ink Prepared

Pigment/Dye and wt % in ink vehicle

| Ink | Cyan Pigment (copper phthalocyanine- based pigment) | Magenta Pigment (quinacridone- based pigment) | Slightly Soluble Magenta Dye (Pro-jet ™ Fast 2 Magenta Dye) | Yellow Pigment (butanamide- based pigment) |
| --- | --- | --- | --- | --- |
| C1 | 2.5 wt % | — | — | — |
| C2 | 2.5 wt % | — | — | — |
| C3 | 2.5 wt % | — | — | — |
| M1 | — | 4.5 wt % | 0.4 wt % | — |
| M2 | — | 4.5 wt % | 0.4 wt % | — |
| M3 | — | 4.5 wt % | 0.4 wt % | — |
| M4 | — | 4.5 wt % | 0.4 wt % | — |
| M5 | — | 4.5 wt % | 0.4 wt % | — |
| Y1 | — | — | — | 3.3 wt % |
| Y2 | — | — | — | 3.3 wt % |
| Y3 | — | — | — | 3.3 wt % |

Example 3—Curl Performance

Various ink-jet inks of Example 2 were tested for curl performance. The inks listed in Table 3 were printed on several office papers at 100% coverage over an area of 8×10 inch and measured for curl in millimeters 72 hours after printing. The results are listed in Table 3, as follows:

TABLE 3

| Ink-Jet Ink of Example 2 | Curl (mm) |
| --- | --- |
| C1 | 15 |
| C2 | 9 |
| C3 | 7 |
| M1 | 8 |
| M2 | 9 |
| M3 | 7 |
| Y1 | 15 |
| Y2 | 9 |
| Y3 | 7 |

Example 4—Decap Performance

Various ink-jet inks of Example 2 were tested for decap performance. The inks listed in Table 3 were printed using an HP Printer and measured for number of electric firing pulses to produce a normal ink drop after a 3 second decap. The results are listed in Table 4.

TABLE 4

| Ink-Jet Ink of Example 2 | Decap (#) |
| --- | --- |
| C1 | 1 |
| C2 | 3 |
| C3 | 4 |
| M1 | 1 |
| M2 | 3 |
| M3 | 4 |
| Y1 | 2 |
| Y2 | 3 |
| Y3 | 4 |

Example 5—Waterfastness

Various ink-jet inks of Example 2 as well as a comparative dye only ink (Comp Dye) and a comparative pigment only ink (Comp Pigment) were also prepared were tested for waterfastness measured as individually printing the ink-jet ink at 100% coverage on a paper, allowing the image to dry, tilting the image to a 45° angle, dropping 0.1 ml of water on the image, allowing the image to dry for 24 hours, and measuring the optical density (OD) of a non-printed portion directly below the printed portion. The Comp Pigment was prepared using Ink Vehicle 1a of Example 1 and 4.5 wt % of the Magenta Pigment (quinacridone-based pigment) from Cabot of Example 2. The Comp Dye was prepared using the Ink Vehicle 1g of Example 1 and 2.5 wt % of a Soluble (more than 5 wt % soluble in water) Magenta Dye Acid Red 52, CAS #3520-42-1, (available from Sensient). The results are listed in Table 5.

TABLE 5

| Ink-Jet Inks | Waterfastness (mOD) |
| --- | --- |
| M1 | 20 |
| M4 | 20 |
| M5 | 20 |
| Comp Dye | 125 |
| Comp Pigment | 0 |

As can be seen in Table 5, the present magenta ink can provide acceptable and exceptional waterfastness using a combination of a slightly soluble dye and a magenta pigment as compared to a comparable dye ink only having a dye colorant. Additionally, while the comparable pigment ink provide exceptional waterfastness, the comparable pigment ink had less saturation (1.02 C*/L*) than the present magenta inks having a magenta pigment and a slightly soluble magenta dye (1.11 C*/L*).

While the disclosure has been described with reference to certain examples, those skilled in the art will appreciate that various modifications, changes, omissions, and substitutions can be made without departing from the spirit of the disclosure. It is intended, therefore, that the disclosure be limited only by the scope of the following claims.

The invention claimed is:

1. An ink set for ink-jet printing, comprising:
a cyan ink-jet ink including a first colorant comprising from about 2 wt % to about 5 wt % of a cyan pigment admixed in a first ink vehicle;
a magenta ink-jet ink including a second colorant comprising from about 2 wt % to about 5 wt % of a quinacridone-based magenta pigment and about 0.1 wt % to about 1 wt % of a slightly soluble magenta dye admixed in a second ink vehicle; and
a yellow ink-jet ink including a third colorant comprising from about 2 wt % to about 5 wt % of a yellow pigment admixed in a third ink vehicle;
wherein the cyan pigment, magenta pigment, and yellow pigment are polymer-dispersed pigments;
wherein the polymer of the polymer-dispersed pigments is a styrene-acrylic resin having an acid number between 40 and 200 and a weight average molecular weight ($M_w$) between 4,000 and 20,000; and
wherein the first, second, and third ink vehicles individually comprise:
an anti-kogation agent,
about 1 wt % to about 30% of a solvent system including a glycol, 2-hydroxyethyl-2-pyrrolidone, and 2-pyrrolidone, and
about 0.1 wt % to about 3 wt % of a surfactant system including a fluorosurfactant and an acetylene oxide surfactant wherein the cyan ink-jet ink, the magenta ink-jet ink, and the yellow ink-jet ink provide a curl of less than 10 mm when printed at 100% coverage over an area of 8×10 inches and measured for curl 72 hours after printing.

2. The ink set of claim 1, wherein the solvent system of the first ink vehicle, the second ink vehicle, and the third ink vehicle further comprises a second glycol and a diol.

3. The ink set of claim 2, wherein the diol is 1,6-hexanediol.

4. The ink set of claim 1, wherein the first ink vehicle, the second ink vehicle, and the third ink vehicle are aqueous ink vehicles.

5. The ink set of claim 1, wherein the magenta colorant and the anti-kogation agent are present in the magenta ink-jet ink in a weight ratio of from 4:1 to 7:1, the cyan pigment and the anti-kogation agent are present in the cyan ink-jet ink in a weight ratio of from 2:1 to 3:1, and the yellow pigment and the anti-kogation agent are present in the yellow ink-jet ink in a weight ratio of from 3:1 to 4:1.

6. The ink set of claim 1, wherein the ink-set provides for waterfastness, measured as individually printing the magenta ink-jet ink, the cyan ink-jet ink and the yellow ink-jet ink at 100% coverage on paper, allowing the image to dry, tilting the image to a 45° angle, dropping 0.1 ml of water on the image, allowing the image to dry for 24 hours, and measuring the optical density (OD) of a non-printed portion directly below the printed portion, where the OD of the non-printed portion is less than 25 mOD units.

7. A method of manufacturing an ink set having a cyan ink-jet ink, a magenta ink-jet ink, and a yellow ink-jet ink, comprising:
admixing a first ink vehicle with a first colorant comprising a cyan pigment to form the cyan ink-jet ink, the cyan pigment present in the cyan ink-jet ink in an amount of from about 2 wt % to about 5 wt %;
admixing a second ink vehicle with a second colorant comprising a quinacridone-based magenta pigment and a slightly soluble magenta dye to form the magenta ink-jet ink, the magenta pigment present in the magenta ink-jet ink in an amount of from about 2 wt % to about 5 wt % and the slightly soluble magenta dye present in the magenta ink-jet ink in an amount of from about 0.1 wt % to about 1 wt %; and
admixing a third ink vehicle with a third colorant comprising a yellow pigment to form the yellow ink-jet ink, the yellow pigment present in the yellow ink-jet ink in an amount of from about 2 wt % to about 5 wt %;
wherein the cyan pigment, magenta pigment, and yellow pigment are polymer-dispersed pigments, and wherein the polymer of the polymer-dispersed pigments is a styrene-acrylic resin having an acid number between 40 and 200 and a weight average molecular weight ($M_w$) between 4,000 and 20,000; and
wherein the first, second, and third ink vehicles individually comprise:
an anti-kogation agent,
about 1 wt % to about 30% of a solvent system including a glycol, 2-hydroxyethyl-2-pyrrolidone, and 2-pyrrolidone, and
about 0.1 wt % to about 3 wt % of a surfactant system including a fluorosurfactant and an acetylene oxide surfactant wherein the cyan ink-jet ink, the magenta ink-jet ink, and the yellow ink-jet ink provide a curl of less than 10 mm when printed at 100% coverage over an area of 8×10 inches and measured for curl 72 hours after printing.

8. The method of claim 7, wherein the magenta colorant and the anti-kogation agent are present in the magenta ink-jet ink in a weight ratio of from 4:1 to 7:1, the cyan pigment and the anti-kogation agent are present in the cyan ink-jet ink in a weight ratio of from 2:1 to 3:1, and the yellow pigment and the anti-kogation agent are present in the yellow ink-jet ink in a weight ratio of from 3:1 to 4:1.

9. A system for printing an ink-set, comprising:
an ink set, comprising:
a cyan ink-jet ink including a first colorant comprising from about 2 wt % to about 5 wt % of a cyan pigment admixed in a first ink vehicle;
a magenta ink-jet ink including a second colorant comprising from about 2 wt % to about 5 wt % of a quinacridone-based magenta pigment and about 0.1 wt % to about 1 wt % of a slightly soluble magenta dye admixed in a second ink vehicle; and
a yellow ink-jet ink including a third colorant comprising from about 2 wt % to about 5 wt % of a yellow pigment admixed in a third ink vehicle;
wherein the cyan pigment, magenta pigment, and yellow pigment are polymer-dispersed pigments, and wherein the polymer of the polymer-dispersed pigments is a styrene-acrylic resin having an acid number between 40 and 200 and a weight average molecular weight ($M_w$) between 4,000 and 20,000
wherein the first, second, and third ink vehicles individually comprise:
an anti-kogation agent,
about 1 wt % to about 30% of a solvent system including a glycol, 2-hydroxyethyl-2-pyrrolidone, and 2-pyrrolidone, and
about 0.1 wt % to about 3 wt % of a surfactant system including a fluorosurfactant and an acetylene oxide surfactant; wherein the cyan ink-jet ink, the magenta ink-jet ink, and the yellow ink-jet ink provide a curl of less than 10 mm when printed at 100% coverage over an area of 8×10 inches and measured for curl 72 hours after printing; and
an ink-jet printer having the cyan ink-jet ink, the magenta ink-jet ink, and the yellow ink-jet ink loaded therein.

10. The system of claim 9, wherein the magenta colorant and the anti-kogation agent are present in the magenta ink-jet ink in a weight ratio of from 4:1 to 7:1, the cyan pigment and the anti-kogation agent are present in the cyan ink-jet ink in a weight ratio of from 2:1 to 3:1, and the yellow pigment and the anti-kogation agent are present in the yellow ink-jet ink in a weight ratio of from 3:1 to 4:1.

11. The ink set of claim 1, wherein the first colorant consists of the cyan pigment, wherein the second colorant consists of the magenta pigment and the magenta dye, and wherein the third colorant consists of the yellow pigment.

12. The ink set of claim 1, wherein the cyan pigment is a copper phthalocyanine-based pigment and wherein the yellow pigment is a butanamide-based pigment.

13. The ink set of claim 1, wherein the glycol in the solvent system is tetraethylene glycol, and wherein the solvent system further comprises 1,6-hexanediol.

14. The ink set of claim 13, wherein the solvent system of the magenta ink-jet ink includes 6.0 wt % 1,6-hexanediol and 6.0 wt % tetraethylene glycol with respect to the total weight of the magenta ink-jet ink, and wherein the solvent systems of the cyan and yellow ink-jet inks include 3.0 wt % 1,6-hexanediol and 3.0 wt % tetraethylene glycol with respect to the total weight of the cyan and yellow ink-jet inks.

15. The ink set of claim 1, wherein the solvent system of the magenta ink-jet ink includes 6.0 to 9.0 wt % 2-hydroxyethyl-2-pyrrolidone, 5.0 to 7.0 wt % 2-pyrrolidone, 3.0 to 9.0 wt % 1,6-hexanediol, and 3.0 to 6.0 wt % tetraethylene glycol with respect to the total weight of the magenta ink-jet ink, and wherein the solvent system of the cyan and yellow ink-jet inks includes 6.0 to 9.0 wt % 2-hydroxyethyl-2-pyrrolidone, 5.0 wt % 2-pyrrolidone, 6.0 to 9.0 wt % 1,6-hexanediol, and 6.0 wt % tetraethylene glycol with respect to the total weight of the cyan and yellow ink-jet inks.

* * * * *